(12) United States Patent
Zhang et al.

(10) Patent No.: US 12,405,725 B2
(45) Date of Patent: Sep. 2, 2025

(54) METHOD, ELECTRONIC DEVICE, AND COMPUTER PROGRAM PRODUCT FOR DATA DETECTION

(71) Applicant: Dell Products L.P., Round Rock, TX (US)

(72) Inventors: Ming Zhang, Beijing (CN); Chen Gong, Beijing (CN); Sheng Wang, Beijing (CN); Huan Chen, Beijing (CN); Jian Liu, Beijing (CN)

(73) Assignee: Dell Products L.P., Round Rock, TX (US)

( * ) Notice: Subject to any disclaimer, the term of this patent is extended or adjusted under 35 U.S.C. 154(b) by 57 days.

(21) Appl. No.: 18/372,316

(22) Filed: Sep. 25, 2023

(65) Prior Publication Data
US 2024/0302963 A1 Sep. 12, 2024

(30) Foreign Application Priority Data
Mar. 6, 2023 (CN) .......................... 202310215250.6

(51) Int. Cl.
*G06F 3/06* (2006.01)
(52) U.S. Cl.
CPC ............ *G06F 3/0608* (2013.01); *G06F 3/064* (2013.01); *G06F 3/0673* (2013.01)
(58) Field of Classification Search
CPC ...... G06F 3/0608; G06F 3/064; G06F 3/0673; G06F 3/0653; G06F 3/0667; G06F 3/0676

USPC ......................................................... 711/154
See application file for complete search history.

(56) References Cited

U.S. PATENT DOCUMENTS

| | | | |
|---|---|---|---|
| 8,527,544 B1 | 9/2013 | Colgrove et al. | |
| 8,793,467 B2 | 7/2014 | Colgrove et al. | |
| 9,563,555 B2 | 2/2017 | Flynn et al. | |
| 11,340,794 B2 | 5/2022 | Himelstein et al. | |
| 2019/0324917 A1* | 10/2019 | Cui | G06F 12/0284 |
| 2019/0384706 A1* | 12/2019 | Kao | G06F 12/0868 |

* cited by examiner

*Primary Examiner* — Hua J Song
(74) *Attorney, Agent, or Firm* — BainwoodHuang

(57) ABSTRACT

Techniques perform data detection. Such techniques involve determining, based on a start sector address of a first mapping range composed of sectors in a physical address space, a first mapping region where the start sector address is located, the first mapping range corresponding to a first virtual block. Such techniques further involve comparing the first mapping region with a second mapping region, a second mapping range corresponding to a second virtual block different from the first virtual block at least partially corresponding to the second mapping region. Such techniques further involve comparing the first mapping range with the second mapping range in response to the first mapping region being the same as the second mapping region. Such techniques further involve determining that the first mapping range overlaps the second mapping range in response to that the first mapping range and the second mapping range have a common range.

20 Claims, 5 Drawing Sheets

METHOD, ELECTRONIC DEVICE, AND COMPUTER PROGRAM PRODUCT FOR DATA DETECTION

CROSS-REFERENCE TO RELATED APPLICATION

This application claims priority to Chinese Patent Application No. CN202310215250.6, on file at the China National Intellectual Property Administration (CNIPA), having a filing date of Mar. 6, 2023, and having "METHOD, ELECTRONIC DEVICE AND COMPUTER PROGRAM PRODUCT FOR DATA DETECTION" as a title, the contents and teachings of which are herein incorporated by reference in their entirety.

TECHNICAL FIELD

Embodiments of the present disclosure relate to the field of computers, and more particularly, to a method, an electronic device, and a computer program product for data detection.

BACKGROUND

In a modern storage design, data compression is an essential function, which requires processing compression mapping. For example, each virtual data block in a file system layer corresponds to a plurality of sectors in a physical address space. Generally, metadata is stored in a virtual data block, while a plurality of sectors with mapping relationships (that is, a mapping range of the virtual data block) store real data associated with the metadata. After a plurality of rounds of relocation (such as deletion, refilling, and reallocation) operations, there is no logical relationship between a virtual data block index and a physical space address (a mapping range location) of the real data, and the mapping range may spread to any place in the physical address space. In this case, mapping ranges corresponding to two virtual data blocks may overlap. This overlap needs to be detected to avoid data conflictions.

SUMMARY OF THE INVENTION

Embodiments of the present disclosure provide a method, an electronic device, and a computer program product for data detection.

According to a first aspect of the present disclosure, a method for data detection is provided. The method includes determining, based on a start sector address of a first mapping range composed of a plurality of sectors in a physical address space, a first reference start mapping region where the start sector address is located, the first mapping range corresponding to a first virtual data block. The method further includes comparing the first reference start mapping region with a second reference mapping region, a second mapping range corresponding to a second virtual data block different from the first virtual data block at least partially corresponding to the second reference mapping region. In addition, the method further includes comparing the first mapping range with the second mapping range in response to that the first reference start mapping region is the same as the second reference mapping region; and determining that the first mapping range overlaps the second mapping range in response to that the first mapping range and the second mapping range have a common range.

According to a second aspect of the present disclosure, an electronic device is provided. The electronic device includes: a processor; and a memory, storing computer program instructions, wherein the processor executes the computer program instructions in the memory to control the electronic device to perform actions including: determining, based on a start sector address of a first mapping range composed of a plurality of sectors in a physical address space, a first reference start mapping region where the start sector address is located, the first mapping range corresponding to a first virtual data block; comparing the first reference start mapping region with a second reference mapping region, a second mapping range corresponding to a second virtual data block different from the first virtual data block at least partially corresponding to the second reference mapping region; comparing the first mapping range with the second mapping range in response to that the first reference start mapping region is the same as the second reference mapping region; and determining that the first mapping range overlaps the second mapping range in response to that the first mapping range and the second mapping range have a common range.

According to a third aspect of the present disclosure, a computer program product is provided. The computer program product is tangibly stored on a non-volatile computer-readable medium and includes machine-executable instructions, wherein the machine-executable instructions, when executed, cause a machine to perform actions including: determining, based on a start sector address of a first mapping range composed of a plurality of sectors in a physical address space, a first reference start mapping region where the start sector address is located, the first mapping range corresponding to a first virtual data block; comparing the first reference start mapping region with a second reference mapping region, a second mapping range corresponding to a second virtual data block different from the first virtual data block at least partially corresponding to the second reference mapping region; comparing the first mapping range with the second mapping range in response to that the first reference start mapping region is the same as the second reference mapping region; and determining that the first mapping range overlaps the second mapping range in response to that the first mapping range and the second mapping range have a common range.

BRIEF DESCRIPTION OF THE DRAWINGS

By more detailed description of exemplary embodiments of the present disclosure with reference to the accompanying drawings, the above and other objectives, features, and advantages of the present disclosure will become more apparent, wherein identical reference numerals generally represent identical components in the exemplary embodiments of the present disclosure.

In the accompanying drawings, identical or corresponding numerals represent identical or corresponding parts.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described in more detail below with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the protection scope of the present disclosure.

In the description of the embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

The principles of the present disclosure will be described below with reference to several example embodiments illustrated in the accompanying drawings. Although the drawings show preferred embodiments of the present disclosure, it should be understood that these embodiments are merely described to enable those skilled in the art to better understand and further implement the present disclosure, and not to limit the scope of the present disclosure in any way.

Figure 1:
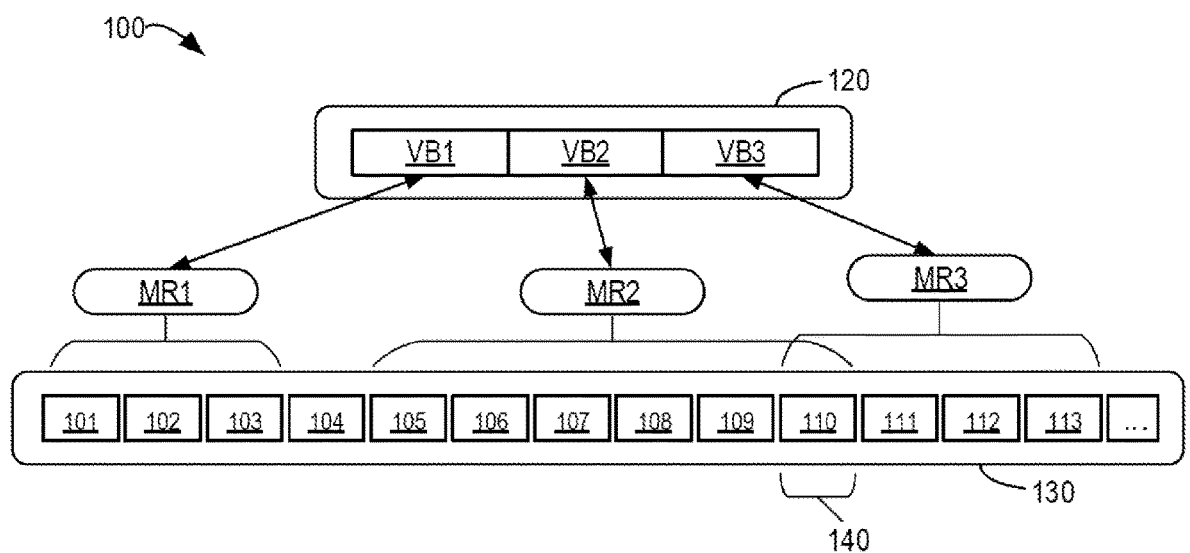
FIG. 1 is a schematic diagram of mapping between a virtual data block and a physical address space.

FIG. 1 is a schematic diagram of mapping 100 between a virtual data block and a physical address space. As shown in FIG. 1, a virtual data block in a virtual address space 120 has a mapping relationship with a plurality of sectors in a physical address space 130. As an example, a virtual data block VB1 in the virtual address space 120 corresponds to a mapping range MR1 composed of a sector 101, a sector 102, and a sector 103 in the physical address space 130, a virtual data block VB2 in the virtual address space 120 corresponds to a mapping range MR2 composed of a sector 105, a sector 106, a sector 107, a sector 108, a sector 109, and a sector 110 in the physical address space 130, and a virtual data block VB3 in the virtual address space 120 corresponds to a mapping range MR3 composed of a sector 110, a sector 111, a sector 112, and a sector 113 in the physical address space 130. It should be understood that the virtual data block usually has a space size of 4k bytes, and the sector is the minimum unit operatable by a disk drive and usually has a space size of 512 bytes.

As mentioned above, the virtual data blocks VB1, VB2, and VB3 are used for storing metadata, and the mapping ranges MR1, MR2, and MR3 are used for storing real data associated with the above metadata. It should be understood that after a plurality of rounds of relocation (such as deletion, refilling, and reallocation) operations, the mapping range corresponding to each virtual data block may spread to any sector in the physical address space. Therefore, as shown in FIG. 1, the mapping range MR2 may overlap the mapping range MR3. In FIG. 1, an overlap region 140 is the sector 110.

In order to detect whether there is an overlap such as the overlap region 140, a conventional overlap detection method needs to sort all mapping ranges, and then compare neighborhood mapping ranges to detect the overlap. Therefore, this is not friendly to a case where the number of mapping ranges is large, and the computing power demand is significantly increased.

In order to solve the problem of large computing power required to detect an overlap when the number of mapping ranges is large, the present disclosure uses an algorithm such as a hash operation to determine a corresponding reference start mapping region for a start sector address of a mapping range, and then compare the reference start mapping region with known reference mapping regions. When the reference start mapping region is the same as one reference mapping region of the known reference mapping regions, it indicates that the mapping range may overlap a mapping range corresponding to the one reference mapping region. At this point, the two mapping ranges may be compared to determine whether they overlap. When the reference start mapping region is the same as one reference mapping region of the known reference mapping regions, a reference end mapping region determined based on an end sector address of the mapping range may be compared with the known reference mapping regions. When the reference end mapping region is the same as one reference mapping region of the known reference mapping regions, it indicates that the mapping range may overlap a mapping range corresponding to the one reference mapping region. At this point, the two mapping ranges may be compared to determine whether they overlap. In other words, the present disclosure creates a concept of a correspondence between a reference start mapping region and a reference end mapping region, so that a relatively rough detection may be performed first, and a more detailed detection may be performed only when there is a possible overlap. An overlap does not occur frequently, and therefore, the detection method provided by the present disclosure can significantly reduce the computing power requirements and shorten the detection time.

An implementation of data storage is described above with reference to FIG. 1. The above examples are only used for illustrating the present disclosure, rather than limiting the present disclosure. A flow chart of a process for data detection will be described in detail below with reference to FIG. 2.

Figure 2:
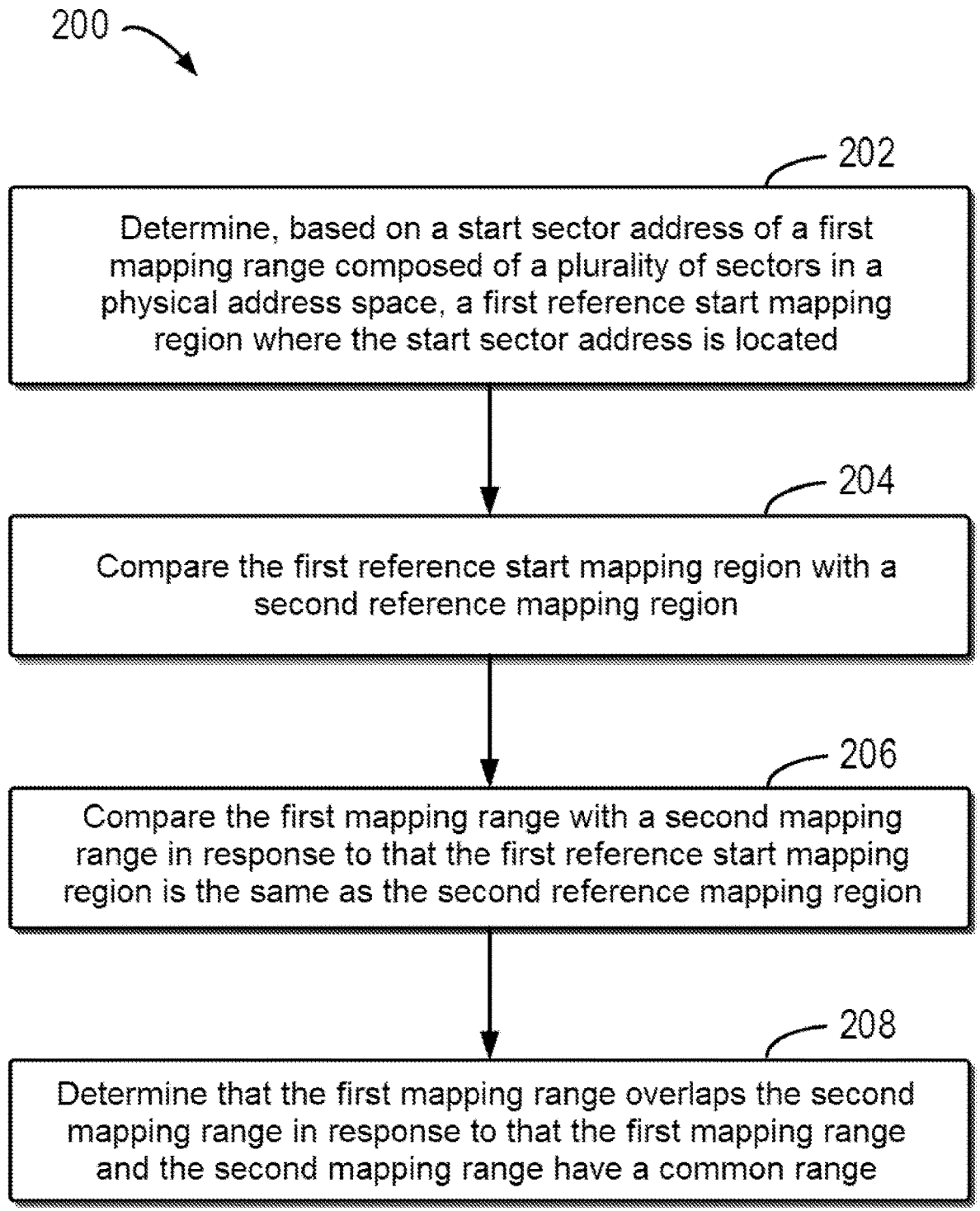
FIG. 2 is a flow chart of a process for data detection according to an embodiment of the present disclosure.

FIG. 2 is a flow chart of a process 200 for data detection according to an embodiment of the present disclosure. The process 200 for data detection according to the embodiment of the present disclosure is described with reference to FIG. 2. For the convenience of understanding, specific data mentioned in the following description is exemplary and is not intended to limit the protection scope of the present disclosure.

At 202, a storage system may determine, based on a start sector address of a first mapping range composed of a plurality of sectors in a physical address space, a first reference start mapping region where the start sector address is located. In the example of FIG. 1, there are at least three mapping ranges in the physical address space 130, namely, mapping ranges MR1, MR2, and MR3. The mapping range MR1 is composed of a sector 101, a sector 102, and a sector 103. An address of the sector 101 is a start sector address of the mapping range MR1. The mapping range MR2 is composed of a sector 105, a sector 106, a sector 107, a sector 108, a sector 109, and a sector 110. An address of the sector 105 is a start sector address of the mapping range MR2. The mapping range MR3 is composed of a sector 110, a sector 111, a sector 112, and a sector 113. An address of the sector 110 is a start sector address of the mapping range MR3. The first reference start mapping region will be described in detail below with reference to FIG. 3A and FIG. 3B.

Figure 3A:
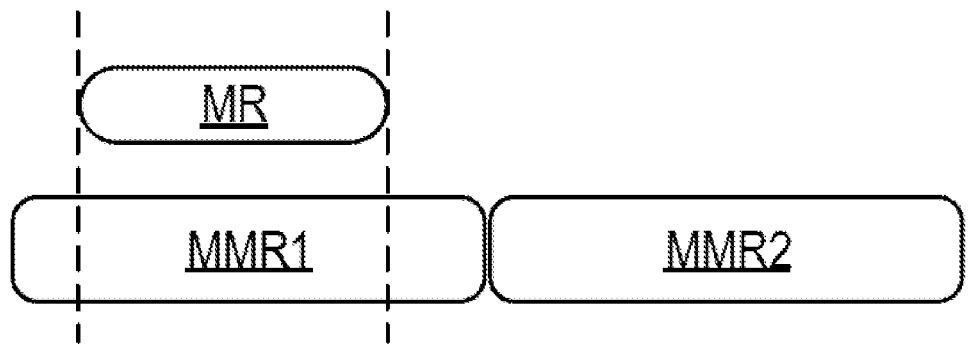
FIG. 3A and FIG. 3B are schematic diagrams of a correspondence between a mapping range and a reference mapping region according to an embodiment of the present disclosure.
Figure 3B:
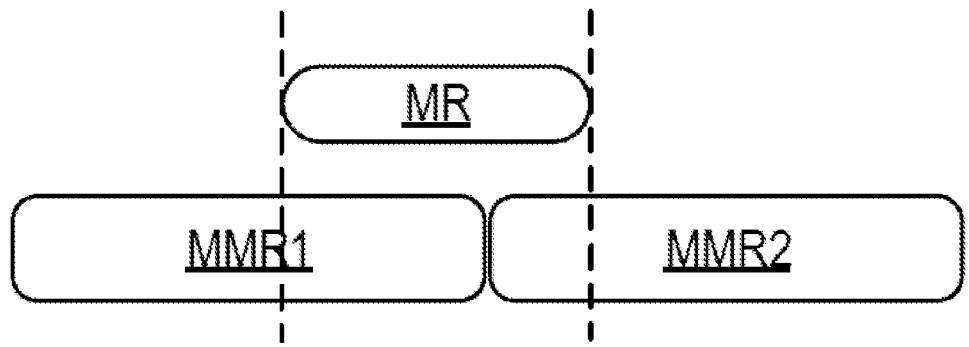

FIG. 3A and FIG. 3B are schematic diagrams of a correspondence between a mapping range and a reference mapping region according to an embodiment of the present disclosure. As shown in FIG. 3A and FIG. 3B, the present disclosure creates a concept of a reference mapping region (which may also be a maximum mapping range, "MMR"). It should be understood that in a process of data compression, a compressed data block is definitely less than or equal to an original data block. Therefore, the storage space size of a virtual data block (such as 4k bytes above) may be taken as the maximum mapping range. In other words, the mapping ranges MR1, MR2, and MR3 in FIG. 1 are all less than or equal to the maximum mapping range. In some embodiments, the first reference start mapping region may include a predetermined number of sectors. As described above, the predetermined number is greater than or equal to the number of a plurality of sectors constituting the first mapping range. Therefore, two maximum mapping ranges are usually required to represent each mapping range.

As an example, the mapping range MR in FIG. 3A is in a reference mapping region MMR1, that is, both a start sector address and an end sector address of the mapping range MR are in the reference mapping region MMR1. As another example, the mapping range MR in FIG. 3B crosses two reference mapping regions MMR1 and MMR2, that is, a start sector address of the mapping range MR is located in the reference mapping region MMR1, and an end sector address is located in the reference mapping region MMR2. Therefore, any mapping range may use "reference mapping region MMR1, default" (corresponding to the case in FIG. 3A) or "reference mapping region MMR1, reference mapping region MMR2" (corresponding to the case in FIG. 3B). Therefore, in the above embodiment, the first reference start mapping region and its corresponding reference end mapping region may be different, that is, the mapping range MR crosses two reference mapping regions MMR1 and MMR2. Alternatively, the first reference start mapping region and its corresponding reference end mapping region may be the same, that is, both the start sector address and the end sector address of the mapping range MR are located in the reference mapping region MMR1. At this time, the reference end mapping region used for representing the end sector address may be defaulted. Thus, an algorithm (such as a hash algorithm) may be established to represent the correspondence between the mapping range and the reference mapping region.

In some embodiments, in order to determine the first reference start mapping region, the storage system may determine an address of a start sector in a plurality of sectors in the first mapping range as the start sector address, and determine a first hash value of the start sector address, the first hash value corresponding to the first reference start mapping region.

Further, at 204, the storage system may compare the first reference start mapping region with a second reference mapping region, and a second mapping range corresponding to a second virtual data block different from the first virtual data block at least partially corresponds to the second reference mapping region. In the embodiment described above, in order to compare the first reference start mapping region with the second reference mapping region, the storage system may compare the first hash value with a second hash value corresponding to the second reference mapping region. Alternatively or additionally, the second hash value may be located in a pre-stored hash table.

At 206, the storage system may compare the first mapping range with the second mapping range, in response to that the first reference start mapping region is the same as the second reference mapping region.

In addition, if the first reference start mapping region is different from the second reference mapping region, the storage system may further determine, based on the end sector address of the first mapping range, a third reference end mapping region where the end sector address is located. Similar to the start sector address, the storage system may compare the third reference end mapping region with the second reference mapping region. If the third reference end mapping region is the same as the second reference mapping region, the storage system may compare the first mapping range with the second mapping range.

At 208, the storage system may determine that the first mapping range overlaps the second mapping range when the first mapping range and the second mapping range have a common range. When the third reference end mapping region is different from the second reference mapping region or the first mapping range and the second mapping range do not have a common range, it may be determined that the first mapping range does not overlap the second mapping range.

Figure 4A:
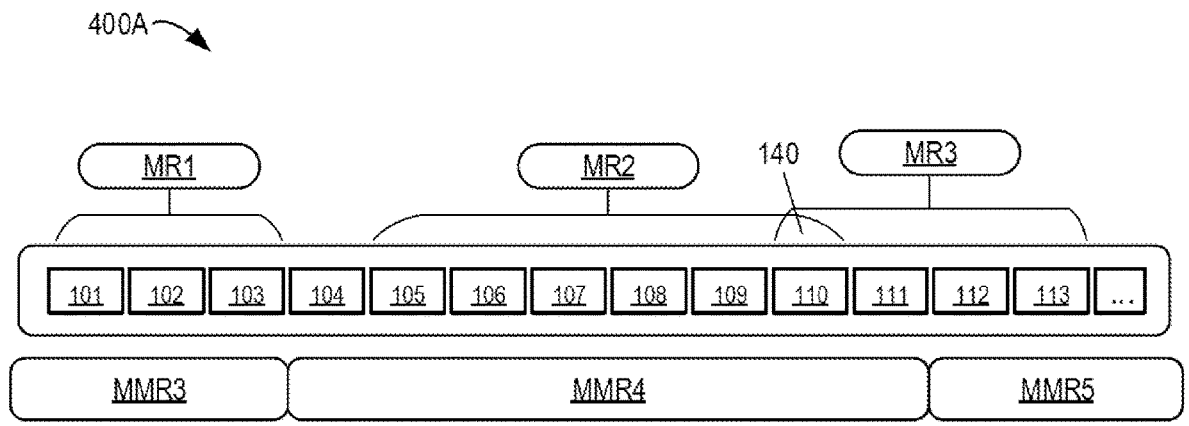
FIG. 4A and FIG. 4B are schematic diagrams of a correspondence between a mapping range and a reference mapping region in a data detection process according to an embodiment of the present disclosure.
Figure 4B:
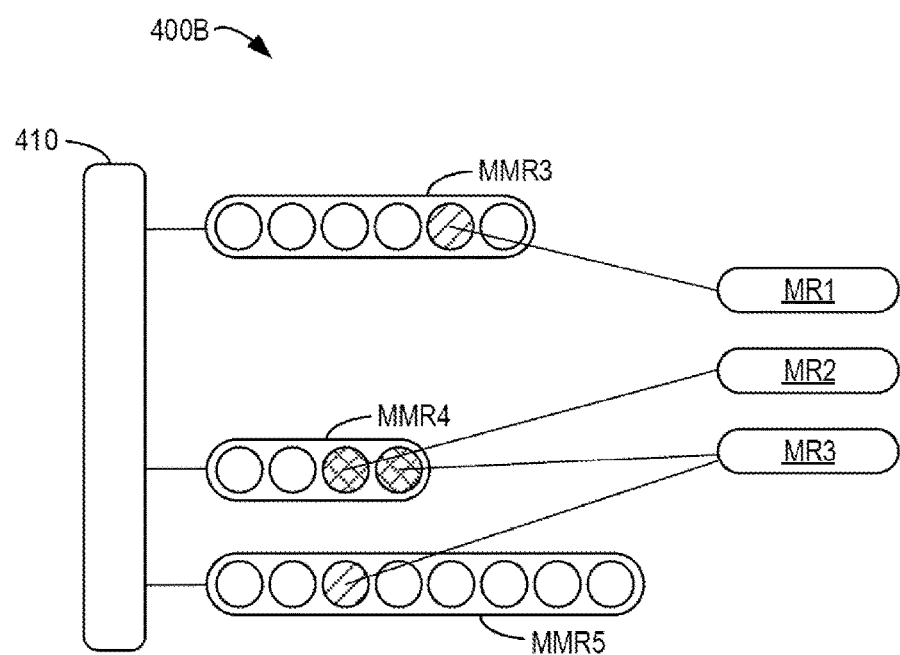
Figure 5:
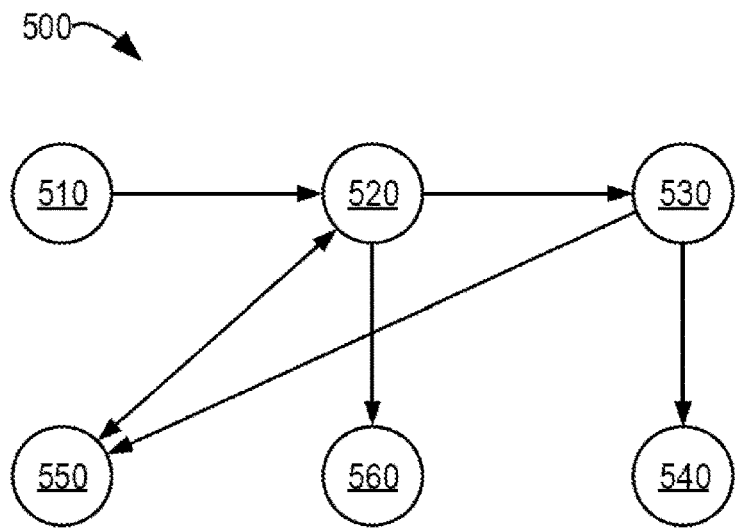
FIG. 5 is a schematic diagram of a workflow for data detection according to an embodiment of the present disclosure.

In order to describe the detailed process of detecting an overlap in more detail, the process is described with reference to FIG. 4A, FIG. 4B, and FIG. 5. FIG. 4A and FIG. 4B are schematic diagrams of a correspondence between a mapping range and a reference mapping region in a data detection process according to an embodiment of the present disclosure. FIG. 5 is a schematic diagram of a workflow 500 for data detection according to an embodiment of the present disclosure.

It should be understood that FIG. 4A is similar to FIG. 1, except that in a correspondence 400A of FIG. 4A, each mapping range is allocated with a corresponding reference mapping region. It should be understood that for the purpose of illustration, the sizes of the reference mapping regions MMR3, MMR4, and MMR5 are shown as different, but in fact, the sizes of the various reference mapping regions are the same. As shown in FIG. 4A and described earlier, the mapping range MR1 is located in the reference mapping region MMR3, the mapping range MR2 is located in the reference mapping region MMR4, and the mapping range MR3 crosses the reference mapping regions MMR4 and MMR5. In fact, in a case of determining the reference mapping region MMR corresponding to the mapping range through hash operation, each mapping range will be linked to at most two MMRs (for example, MR1 and MR2) inside a hash table 410, while another mapping range will be linked to a single MMR (for example, MR3). As shown in FIG. 4B, a confliction may be found at the MMR4 in the hash table 410. By detecting the MMR confliction, it is easier to detect an overlap without a sorting operation.

In the workflow 500 in FIG. 5, at 510, the storage system may determine, based on a start sector address (an address of the sector 110) of the mapping range MR3 composed of a plurality of sectors in the physical address space, a reference start mapping region where the start sector address is located, that is, the reference mapping region MMR4. As an example, a hash value of the start sector address may be determined by the hash algorithm, and the hash value may represent the reference mapping region MMR4.

Further, at 520, the storage system may compare the determined hash value representing the reference mapping region MMR4 with a hash value in the predetermined hash table. As an example, a start sector address and an end sector address of the mapping range MR1 in FIG. 4A are pre-determined to be located in the reference mapping region MMR3, while a start sector address and an end sector address of the mapping range MR2 are pre-determined to be located in the reference mapping region MMR4. Hash values corresponding to the reference mapping region MMR3 and the reference mapping region MMR4 are pre-stored in the hash table. Obviously, it may be determined that the reference start mapping region corresponding to the start sector address of the mapping range MR3 is the same as the reference mapping region where the start sector address and the end sector address of the mapping range MR2 are located, both of which are the reference mapping region MMR4. Therefore, the mapping range MR2 may overlap the mapping range MR3. Thus, the workflow proceeds to 530.

At 530, the storage system may perform a general comparison between the mapping range MR2 and the mapping range MR3. As an example, when the mapping range MR2 and the mapping range MR3 have a common range (for example, the common sector 110 in FIG. 4A), it may be determined that the mapping range MR2 and the mapping range MR3 have an overlap 140. When the mapping range MR2 and the mapping range MR3 do not have a common range, it may be determined that the mapping range MR2 does not overlap the mapping range MR3. Thus, the storage system may output a detection result at 540.

In addition, at 520, if the hash value of the reference start mapping region where the start sector address of the mapping range MR3 is located is different from hash values in the predetermined hash table, it is necessary to further determine, at 550, a hash value of the reference end mapping region where the end sector address of the mapping range MR3 is located, and return to 520 to determine whether the hash value of the reference end mapping region where the end sector address of the mapping range MR3 is located is the same as the hash values in the predetermined hash table. If they are still different (this is usually the case), it indicates that the mapping range MR3 does not overlap another mapping range, so the detection result may be output at 560. If the comparison result at 520 is still the same, it indicates that the end sector address of the mapping range MR3 may still overlap another mapping range. Therefore, it is necessary to go back to 530 to determine whether the mapping range MR3 overlaps the suspected mapping range, and output the detection result at 540.

It should be understood that the process of determining whether the hash values are the same is a process of finding a hash confliction. Therefore, the above embodiment is more suitable for a scenario where conflictions occur infrequently. For the number of conflictions, the following equation may be given:

$$ConflictionNum = \qquad \qquad \text{Equation (1)}$$
$$rangeCrossMMRRate \times 2 \times (MMRSize / AVG(\text{rangeSize})) +$$
$$rangeSingleMMRRate \times (MMRSize / AVG(\text{rangeSize}))$$

ConflictionNum is used for representing the number of conflictions.

rangeCrossMMRRate is used for representing the percentage of a mapping range crossing MMRs in the total mapping range, for example, 50%.

rangeSingleMMRRate is used for representing the percentage of a mapping range of a single MMR in the total mapping range, for example, 50%.

AVG (rangeSize) is used for representing the average size of a mapping range, that is, an average number of sectors.

MMRSize is used for representing the number of sectors of the MMR.

When rangeCrossMMRRate and rangeSingleMMRRate are both 50%, the equation (1) may be expressed as:

$$ConflictionNum = (3/2) * (MMRSize / AVG(\text{rangeSize})) \qquad \text{Equation (2)}$$

As can be seen from the equation (2), the number of conflictions is directly related to MMRSize/AVG(rangeSize). MMRSize/AVG(rangeSize) may represent a general compression rate in a storage application. As described above, the embodiment of the present disclosure is more suitable for a scenario with a small number of conflictions or a low compression ratio.

By implementing the above embodiments, the present disclosure creates the concept of the correspondence between the reference start mapping region and the reference end mapping region, and provides a solution of quickly detecting an overlap of physical sectors in a compression storage process. The solution can accurately detect an overlap and save a lot of CPU resources, thus improving the performance.

Figure 6:
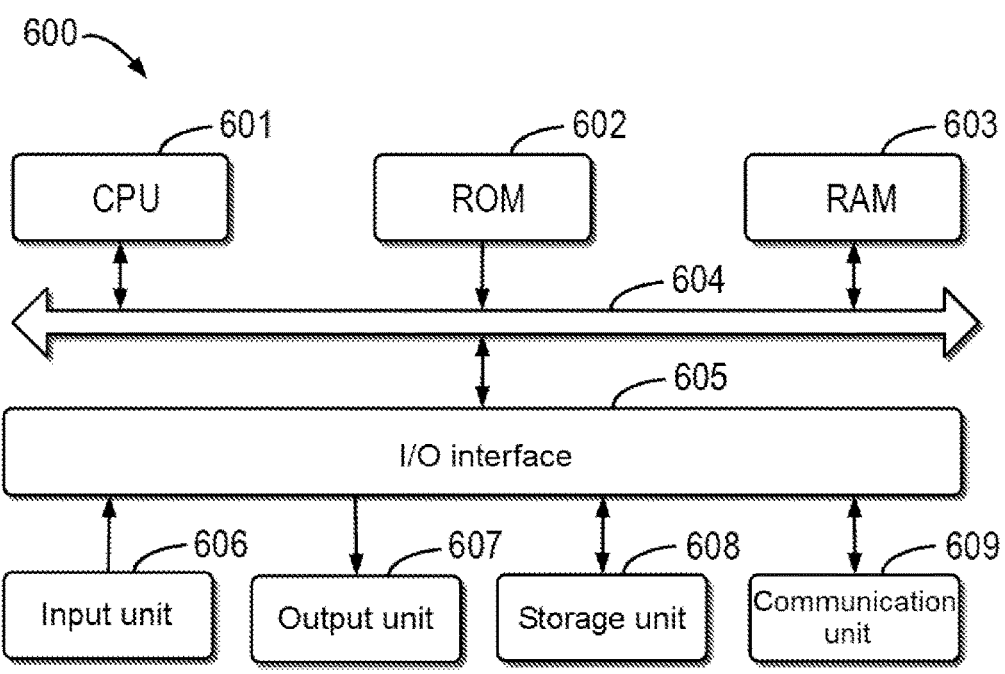
FIG. 6 is a schematic block diagram of an example device suitable for implementing an embodiment of the present disclosure.

FIG. 6 illustrates a schematic block diagram of example device 600 suitable for use to implement embodiments of the present disclosure. As shown in the figure, device 600 includes central processing unit (CPU) 601 that may execute various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various processes and processing described above, such as process 200, may be executed by processing unit 601. For example, in some embodiments, process 200 may be implemented as a computer software program that is tangibly included in a machine-readable medium, for example, storage unit 608. In some embodiments, part of or all the computer program may be loaded and/or installed onto device 600 via ROM 602 and/or communication unit 609. When the computer program is loaded into RAM 603 and executed by CPU 601, one or more actions of process 200 described above may be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or technical improvements to technologies on the market, or to enable other persons of ordinary skill in the art to understand the embodiments disclosed here.

The invention claimed is:

1. A method for data detection, comprising:
   determining, based on a start sector address of a first mapping range composed of a plurality of sectors in a physical address space, a first reference start mapping region where the start sector address is located, the first mapping range corresponding to a first virtual data block;
   comparing the first reference start mapping region with a second reference mapping region, a second mapping range corresponding to a second virtual data block different from the first virtual data block at least partially corresponding to the second reference mapping region;
   comparing the first mapping range with the second mapping range in response to that the first reference start mapping region is the same as the second reference mapping region; and
   determining that the first mapping range overlaps the second mapping range in response to that the first mapping range and the second mapping range have a common range;
   wherein determining the first reference start mapping region comprises:
   determining an address of a start sector in the plurality of sectors in the first mapping range as the start sector address; and
   determining a first hash value of the start sector address the first hash value corresponding to the first reference start mapping region.

2. The method according to claim 1, further comprising:
   determining, based on an end sector address of the first mapping range, a third reference end mapping region where the end sector address is located in response to that the first reference start mapping region is different from the second reference mapping region;
   comparing the third reference end mapping region with the second reference mapping region;
   comparing the first mapping range with the second mapping range in response to that the third reference end mapping region is the same as the second reference mapping region; and
   determining that the first mapping range overlaps the second mapping range in response to that the first mapping range and the second mapping range have a common range.

3. The method according to claim 2, wherein the first reference start mapping region and the third reference end mapping region are the same or different.

4. The method according to claim 1, wherein comparing the first reference start mapping region with the second reference mapping region comprises:
   comparing the first hash value with a second hash value corresponding to the second reference mapping region.

5. The method according to claim 4, wherein the second hash value is located in a pre-stored hash table.

6. The method according to claim 1, further comprising:
   determining that the first mapping range does not overlap the second mapping range in response to that the first mapping range and the second mapping range do not have a common range.

7. The method according to claim 1, wherein the first reference start mapping region comprises a predetermined number of sectors, and the predetermined number is greater than or equal to the number of the plurality of sectors.

8. The method according to claim 1, wherein the first virtual data block comprises metadata, and the first mapping range comprises real data associated with the metadata.

9. An electronic device, comprising:
   a processor; and
   a memory coupled to the processor and having instructions stored therein, wherein the instructions, when executed by the processor, cause the electronic device to perform actions comprising:
   determining, based on a start sector address of a first mapping range composed of a plurality of sectors in a physical address space, a first reference start mapping region where the start sector address is located, the first mapping range corresponding to a first virtual data block;
   comparing the first reference start mapping region with a second reference mapping region, a second mapping range corresponding to a second virtual data block different from the first virtual data block at least partially corresponding to the second reference mapping region;
   comparing the first mapping range with the second mapping range in response to that the first reference start mapping region is the same as the second reference mapping region; and
   determining that the first mapping range overlaps the second mapping range in response to that the first mapping range and the second mapping range have a common range;
   wherein determining the first reference start mapping region comprises:
   determining an address of a start sector in the plurality of sectors in the first mapping range as the start sector address; and determining a first hash value of the start sector address, the first hash value corresponding to the first reference start mapping region.

10. The device according to claim 9, wherein the actions further comprise:
determining, based on an end sector address of the first mapping range, a third reference end mapping region where the end sector address is located in response to that the first reference start mapping region is different from the second reference mapping region;
comparing the third reference end mapping region with the second reference mapping region;
comparing the first mapping range with the second mapping range in response to that the third reference end mapping region is the same as the second reference mapping region; and
determining that the first mapping range overlaps the second mapping range in response to that the first mapping range and the second mapping range have a common range.

11. The device according to claim 10, wherein the first reference start mapping region and the third reference end mapping region are the same or different.

12. The device according to claim 9, wherein comparing the first reference start mapping region with the second reference mapping region comprises:
comparing the first hash value with a second hash value corresponding to the second reference mapping region.

13. The device according to claim 12, wherein the second hash value is located in a pre-stored hash table.

14. The device according to claim 9, wherein the actions further comprise:
determining that the first mapping range does not overlap the second mapping range in response to that the first mapping range and the second mapping range do not have a common range.

15. The device according to claim 9, wherein the first reference start mapping region comprises a predetermined number of sectors, and the predetermined number is greater than or equal to the number of the plurality of sectors.

16. The device according to claim 9, wherein the first virtual data block comprises metadata, and the first mapping range comprises real data associated with the metadata.

17. A computer program product having a non-transitory computer readable medium which stores a set of instructions to perform data detection; the set of instructions, when carried out by computerized circuitry, causing the computerized circuitry to perform a method of:
determining, based on a start sector address of a first mapping range composed of a plurality of sectors in a physical address space, a first reference start mapping region where the start sector address is located, the first mapping range corresponding to a first virtual data block;
comparing the first reference start mapping region with a second reference mapping region, a second mapping range corresponding to a second virtual data block different from the first virtual data block at least partially corresponding to the second reference mapping region;
comparing the first mapping range with the second mapping range in response to that the first reference start mapping region is the same as the second reference mapping region; and
determining that the first mapping range overlaps the second mapping range in response to that the first mapping range and the second mapping range have a common range;
wherein the method further includes:
determining, based on an end sector address of the first mapping range, a third reference end mapping region where the end sector address is located in response to that the first reference start mapping region is different from the second reference mapping region;
comparing the third reference end mapping region with the second reference mapping region;
comparing the first mapping range with the second mapping range in response to the third reference end mapping region being the same as the second reference mapping region; and
determining that the first mapping range overlaps the second mapping range in response to that the first mapping range and the second mapping range have a common range.

18. The computer program product according to claim 17, wherein determining the first reference start mapping region comprises:
determining an address of a start sector in the plurality of sectors in the first mapping range as the start sector address; and
determining a first hash value of the start sector address, the first hash value corresponding to the first reference start mapping region.

19. The computer program product according to claim 17, further comprising:
determining that the first mapping range does not overlap the second mapping range in response to that the first mapping range and the second mapping range do not have a common range.

20. The computer program product according to claim 17, wherein the first reference start mapping region comprises a predetermined number of sectors, and the predetermined number is greater than or equal to the number of the plurality of sectors.

* * * * *